Figure 1:
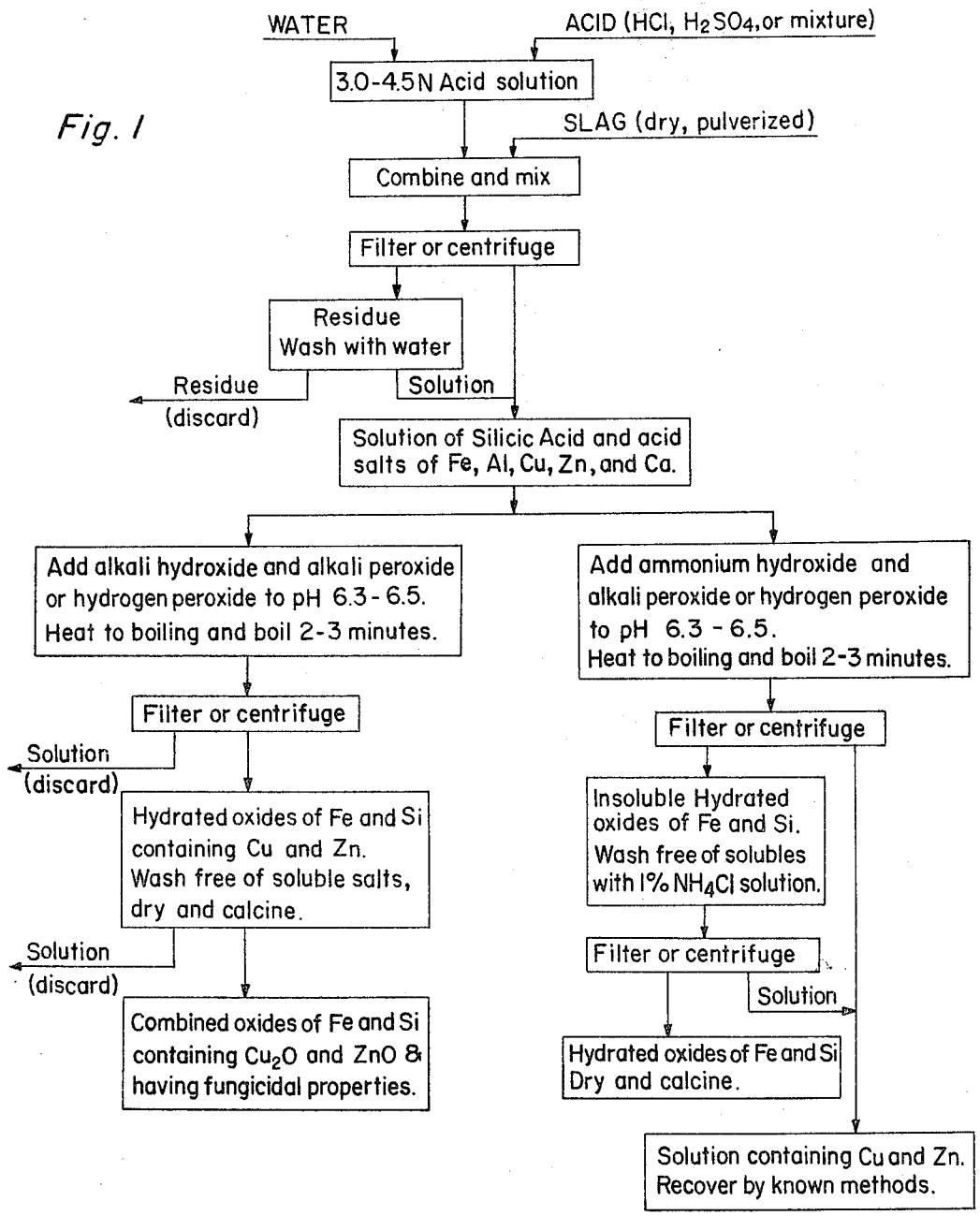

Harold W. Wilson
INVENTOR.

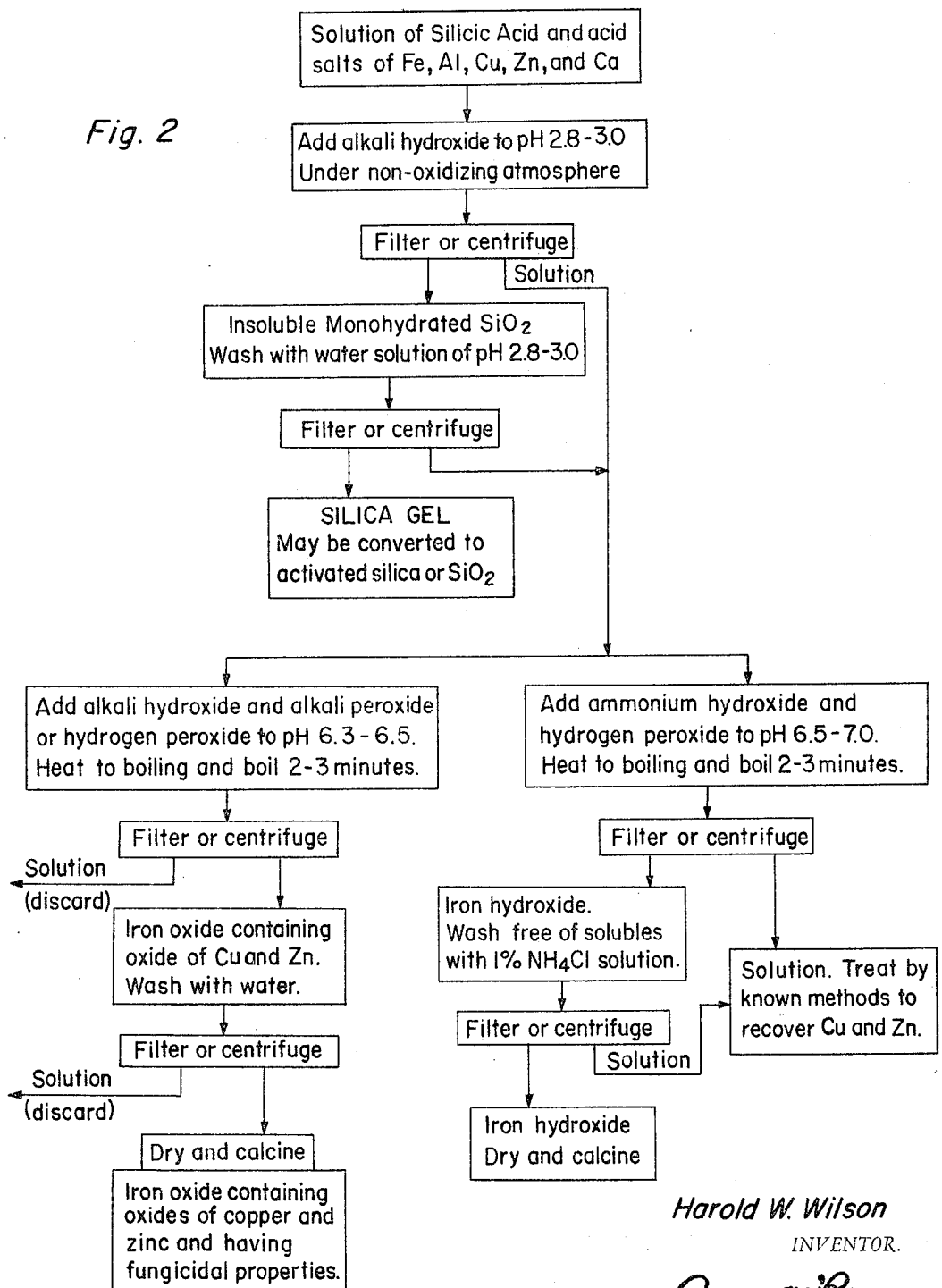

United States Patent Office 3,269,831
Patented August 30, 1966

3,269,831
PROCESS FOR THE RECOVERY OF CERTAIN CONSTITUENTS OF WASTE SLAG FROM REVERBERATORY REFINING OF COPPER PYRITIC-TYPE ORES
Harold W. Wilson, El Paso, Tex., assignor of fifty percent to Wilson Laboratories, Inc., El Paso, Tex., a corporation of Texas, ten percent to Jack W. Flowers, Waco, Tex., ten percent to James H. Maxey, Fresno, Calif., and ten percent to David C. Casey, ten percent to Weseley D. Rogers, Jr., and ten percent to Vernon E. Thompson, all of Lubbock, Tex.
Filed Mar. 10, 1964, Ser. No. 350,777
11 Claims. (Cl. 75—108)

This invention relates to the recovery of certain metallic and non-metallic constituents of waste slag produced as a result of smelting copper pyritic ores in a reverberatory copper refining furnace.

In United States patent applications Serial No. 333,333, filed December 26, 1963, now abandoned, and Serial No. 348,063, filed February 28, 1964, I have described a process for effecting the separation and recovery of certain metallic and non-metallic constituents from the slag produced as a result of smelting copper pyritic ores. In the process described, the slag is treated with 4 normal acids selected from the group consiting of $HNO_3$ containing nitrogen dioxide, HCl and $H_2SO_4$ or mixtures of such acids.

The process of the instant invention differs from that described in the above noted application in several respects as will appear from the description which follows.

Due to the chemical composition of the ore and as a result of the way it has been refined, the slag resulting as a waste product from the reverberatory refining of copper pyritic ore contains appreciable amounts of iron as metal and as iron oxides and silicates as well as some metallic copper, zinc, and lead, all in combination with alkaline earth metals in a matrix of metallic and non-metallic silicates containing residual amounts of metallic sulfides.

A principal object of this invention is the provision of a process for the purpose of separating, isolating and recovering a major portion of the iron in said waste slag, and the recovery of the silica, calcium, copper, and zinc contained in the slag.

A more specific object of the invention is the treatment of such slag with aqueous acid solutions for the purpose of selectively dissolving that portion of the slag consisting mainly of metallic iron, iron oxides, and metallic copper, and zinc while at the same time dissolving limited amounts of the silicate constituent of such slag. And, in particular, it is a special object of this process to react such slag with an acidic solution without causing a conversion of the silica dissolved by such acidic solutions into an insoluble silica gel (dehydrated) form until such time as it has been separated selectively from the other constituents found in the acid solubilized portion of treated slag.

These and other objects are accomplished by the process shown schematically in the several sheets of drawings in the nature of flow sheets accompanying this application, which illustrate various alternatives in the process constituting this invention.

Briefly the process of this invention comprises:

(1) Treatment of the waste slag with aqueous solutions of approximately 4 normal strength mineral acid or mixtures of mineral acids possessing temperatures due to exothermic heats of dilution and of solution such that no external heat is required to effect maximum dissolution of the acid soluble metals and metallic oxides and metallic silicates contained in the waste slag so as to be able to obtain, by mechanical separation, an insoluble residue and a solution containing substantially all of the iron, silicon, aluminum, calcium, copper, and zinc values in this slag;

(2) Treatment of the solution of the acid soluble constituents of the slag with either (1) sufficient alkali hydroxide to bring the solution to a pH between 2.8 and 3 thereby precipitating insoluble monohydrated silica, which may be separated from the solution and recovered directly as silica gel or (2) sufficient alkali hydroxide and a suitable peroxide to bring the solution to a pH of 6.3 to 6.5, then boiling the solution thereby precipitating a precipitate containing the iron, silicon, copper and zinc as hydrated oxides or oxides, and recovering the precipitate separately from the liquid or (3) sufficient ammonium hydroxide and a suitable peroxide to bring the pH to 6.3 to 6.5, then boiling the solution, thereby precipitating the iron and silicon as hydrated oxides and recovering the same separately from the copper and zinc which remain in solution; and (3) When the first route above is followed, adjusting the pH of the solution to at least 6.3 by addition of a base and a peroxide, boiling the solution and precipitating the iron as a hydroxide either separately or along with oxides of copper and zinc, depending on the nature of the base added and on the pH ultimately reached.

The invention hereinafter described is to treat such waste slag with certain aqueous solutions of mineral acids and additional chemical substances in such manner as to dissolve a maximum quantity of the slag treated, while at the same time preventing any acid insoluble gel from forming, and hence is entirely different from the invention described in my earlier United States Patent 2,927,851. It has been found that the solution obtained as a result of such treatment of the waste slag can be further treated chemically to make possible selective separation, isolation, and recovery of the mineral values therein.

In this description, wherever reference is made to "slag" such reference is made to the waste product obtained from copper pyritic type ores which have been processed by the metallurgical process known as reverberatory refining. For use in the present process the slag is ground until a minimum of 90% passes a 200 mesh U.S. Standard Sieve. The following approximate composition is typical of such waste slag:

28%–32% iron expressed as Fe (and present as metal oxides, and silicate);

32–38% silicon dioxide (present as mixed silicates of iron, calcium, aluminum, and magnesium);

8%–10% expressed as CaO (present as basic silicate);

6%–8% expressed as $Al_2O_3$ (present as silicate);

2%–3% zinc;

Less than 0.5% lead;

0.3–0.5% copper; and

Less than 1% sulfur (as metal sulfides).

In order to obtain the maximum degree of acid solvation of the slag exposed to treatment and in order to prevent the soluble dihydrated silicon dioxide formed through acid hydrolysis of the acid soluble silicates of the slag from forming insoluble monohydrated silicon dioxide ($SiO_2 \cdot H_2O$) which during its formation creates a gel, it is necessary to maintain an acid concentration of the aqueous acid dissolving medium in the range of 3.0 to 4.5 normal and a minimum water content in the slag-acid-water system of not less than 65%. Use of acids more dilute than a 3.0 normal acid greatly reduces the solvation process, while acid solutions more concentrated than 4.5 normal cause gel formation within minutes of combining the acid solution with the slag. At no time should the temperature of the slag-aqueous acid system (nor the acid solubilized portion after its removal from the insolubles) exceed 175° F., nor should either of the noted systems be allowed to stand for prolonged time periods.

The lower the acid concentration, the higher the water concentration, or the lower the temperature, the longer the liquids can remain undisturbed without the occurrence of gelation. The liquid obtained with 4 normal hydrochloric acid containing 65% water and left standing undisturbed at 80° F. temperature forms a gel in about 8 hours. The same system gels to the same degree of rigidity in approximately 2 hours merely by raising its temperature to 178° F. The gel in both cases is irreversible and neither cooling or dilution with water will effect re-solution of the gelled matter.

In accordance with the above, crushed waste slag is first treated with at least one acid selected from the group consisting of hydrochloric, sulfuric, and mixtures of these acids.

Use is made of the exothermic heats of dilution and solution incident to the addition of the acid or acids to the water in the preparation of the acid solution to be used as a solvent, by preparing the acid solution immediately prior to the addition of the acid solution to the dry slag. Use of the warm acid solutions improves the solubilizing effectiveness as compared with the effectiveness of atmospheric temperature acid solution solubilizing of atmospheric temperature slag. By preparing the acid solutions immediately prior to addition to the slag, both the cost of providing external heat required to achieve maximum solvation of the acid soluble components of the slag and the inherent danger of at least partial gelation occurring as a result of localizing overheating of the slag-acid mixture from use of external heating are eliminated.

The available exothermic heats of dilution and solution when various concentrated acids are added to water initially at a temperature of approximately 80° F. (atmospheric) in the preparation of 4 normal solutions are indicated by the temperature rises resulting from the acid addition of the named acid to water to produce a 4 N solution of the acid.

| Kind and conc. of acid used (@ 80° F. temp.): | Temperature of 4 N acid (From heat of dil. & sol'n) ° F.: |
|---|---|
| HCl—12 N | 102 |
| $H_2SO_4$—36 N | 142 |
| HCl—12 N and $H_2SO_4$—36 N | 100 |

Comparative examples of temperature rises resulting from heats of reaction when freshly prepared 4 normal acid solutions still warmed by heat of dilution and solution and 4 normal acid solutions which have been permitted to cool to atmospheric temperature (80° F.) are added to the same weight of approximately 80° F. temperature, dry, pulverized slag are shown below:

| Kind and temp. of acid (With heat of dil'n): | Temp. from reaction, ° F.: |
|---|---|
| HCl—4 N @ 102° F. | 157 |
| $H_2SO_4$—4 N @ 135° F. | 173 |
| $H_2SO_4$—HCl 4 N @ 100° F. | 136 |

| Kind and temp. of acid (Cooled before use): | Temp. from Reaction, ° F.: |
|---|---|
| HCl—4 N @ 80° F. | 132 |
| $H_2SO_4$—4 N @ 80° F. | 142 |
| $H_2SO_4$—HCl 4 N 278° F. | 116 |

The percent slag dissolved by the use of various acid solutions varies between 40% and 55% with the higher percentage resulting from use of hydrochloric and the lower percentage resulting from use of mixed sulfuric and hydrochloric in a ratio of 1:1 by volume—or a normality ratio of 3:1. When the acid used for the initial treatment of the slag is sulfuric or sulfuric in combination with hydrochloric acid most of the calcium dissolved recombines with the sulfate ion to form calcium sulfate hexahydrate which for the greater part remains with the acid insoluble residue after separation from the acid soluble liquid portion. This calcium sulfate may be recovered by leaching the residue with hot 5% ammonium chloride solution in which the calcium salt is soluble. After separation the calcium salt solution can be treated by various known methods for recovery of calcium sulfate dihydrate or hemihydrate.

A description of a specific example of the acid solubilization portion of this process which is essentially the same as that described in my above noted application is as follows: 100 grams of waste slag (which has been previously pulverized to a fineness of approximately 90% minus 200 mesh U.S. Std. Sieve) is placed in a suitable container. In a second container, 120 ml. of water are combined with 60 ml. of hydrochloric acid (37%–38% HCl, Sp. G. 1.19) and this aqueous-acid mixture (4 normal), immediately after it is prepared is added to the pulverized slag in the first container. The temperature of the 4 normal acid before it is added to the slag is approximately 105° F. After adding the acid solution to the slag the mixture is thoroughly and continuously stirred for a time period of 8–10 minutes after which it is immediately separated by centrifuging or filtering. The acid insoluble residue is washed free of any occluded acid soluble matter and these washing are added to the previously separated liquid acid soluble portion. The solid acid insoluble portion is discarded.

After the initial treatment of the slag, in which the acid soluble portion of the waste slag is dissolved, the acid insoluble residue is separated from the acid soluble portion by vacuum filtration or pressure filtration or by centrifuging. Any residual acid soluble material is removed from the solid residue by washing the residue with water. The washings are combined with the acid soluble solution.

The liquid portion obtained from the above process may be treated by any of three processes each of which is different from the processes described in my above noted application.

*Process 1*

The solution obtained by dissolving the acid soluble constituents of the slag as described above contains silicic acid and the acidic salts of ferrous iron, aluminum, cuprous copper, zinc, and calcium (when the dissolving acid used was not sulfuric acid). This solution is treated with stirring, with a sufficient amount of aqueous alkali metal hydroxide solution (NaOH or KOH) preferably of approximately 10%–20% alkali concentration and alkali peroxide ($Na_2O_2$) or hydrogen peroxide ($H_2O_2$) to cause the ferrous iron of the system to be converted into ferric iron oxide trihydrate, the silicic acid to be converted into insoluble monohydrate of silicon dioxide, the aluminum acid salt to be remain in solution as the aluminum acid salt, the cuprous copper and the zinc acid salt to be converted into their respective hydrated oxides, and the calcium to remain as the calcium acid soluble salt in soluble form while the pH of the solution is changed by the addition of the alkali hydroxide from approximately between 0.5 and 1.5 to between 6.3 and 6.5. After adjusting the pH to this noted range the resulting mixture is heated to boiling to effect complete oxidation of the iron and to effect coagulation of the combined hydrated oxides of iron, cuprous copper, and zinc in intimate combination with the monohydrated oxide of silicon dioxide. The combination of silica and hydrated metallic oxides are physically separated from the solution containing the soluble aluminum and calcium salts e.g. by centrifuging and filtering. The insolubles are then washed with distilled water acidified to a pH of 6.3–6.5 and the washings added to the solution containing the aluminum and calcium acid salts. The separated insoluble composite of oxides of iron, silicon, copper, and zinc is dried at a temperature of 100°–105° C. after which this composition is ground in the presence of distilled water to a fine state of division to permit solubilization and removal of any residue of soluble salts without allowing conversion of the composite of hydrated oxides to form a soluble colloidal sol. The finely ground composite of oxides is washed again to remove the last traces of soluble salts and is then separated from any liquid remaining by filtration or centrifugation. Thereafter the solid composite is calcined to effect total dehydration of the oxides producing a product having a ratio of approximately 2 parts of ferric oxide ($Fe_2O_3$), 1 part of silicon dioxide, 0.2 part of zinc oxide (ZnO), and 0.02 part of copper oxide ($Cu_2O$). This product is unique in that it is a product of intermolecular composition wherein, rather than a mere mixture of the several component oxides possibly as a result of the method of formation (coprecipitation) whereby the oxides are intimately associated chemically as well as physically. This product can not be duplicated, for example, by grinding together the respective ingredients. In addition, the product is unique in that its content of cuprous oxide (predominantly ($Cu_2O$) and zinc oxide dispersed throughout the product in this manner of intermolecular arrangement gives the product an exceptionally high level of activity as a fungicidal agent—either when the product is used in surface coatings as a combination coloring, hiding, extending, and fungicidal pigment, or when the product is employed in agricultural applications as a fungicide containing micron sized cuprous oxide and zinc with the iron oxide and silica being the carrier agent.

Process 2

The initial solution produced as a result of the acid treatment of the slag contains the same components as noted above under Process 1. The solution is treated with aqueous alkali hydroxide solution (NaOH or KOH) preferably of approximately 10%–20% concentration of alkali until the system has a pH between 2.9 and 3.0. Since in the original acid solvation of the slag both hydrogen and hydrogen sulfide (strong reducing agents) are liberated, the metallic ions (primarily the ferrous iron) remain in their reduced state. When the alkali hydroxide solution is added to the noted pH practically none of the metallic ions (particularly the ferrous ion) are sufficiently oxidized by exposure to the atmosphere to precipitate. As a result the monohydrated silica which precipitates contains only very small amounts of ferric oxide trihydrate. To prevent or minimize atmospheric oxidation a blanket of inert gas can be employed over the solution during the addition of the alkali hydroxide. The insoluble monohydrated silica is separated from the solution by filtration or centrifuging. The insoluble silica is washed with water acidified to a pH of about 3.0 to remove acid solubles and this wash solution is added to the main body of solution obtained from the filtration or centrifugation. The washed, insoluble, hydrated silica is dried at temperatures between 80° and 100° C. until it has lost between 75% to 80% of its water of hydration as noted by its being crumbly and easily friable between the fingers. Excessive drying to a hard and glassy state is totally undesirable. The nearly dehydrated silica is treated with sufficient concentrated sulfuric acid (98%) such as to result in a composition of approximately 9 normal concentration with respect to sulfuric acid. This composition is heated at about 80° C. for 2–3 hours after which it is diluted with sufficient water to increase its over-all volume by about 8–10 times. The diluted solution is heated to 80°–90° C. after which it is separated by filtration or centrifuging to give a dehydrated (insoluble) silica and a solution of impure sulfuric acid which may be used after increasing its sulfuric acid concentration to the proper 4 normal level as the solvation acid in the original acid treatment of the slag. The iron, cuprous copper, aluminum, calcium, and zinc values therein may be recovered from the silica free solution by either of the two different procedures as follows:

Process 2A

Alkali metal hydroxide and $Na_2O_2$ or $H_2O_2$ may be added to the solution as described under Process 1 and the solution then boiled to produce a precipitate of ferric oxide trihydrate containing cuprous copper oxide and zinc oxide hydrates but free of silica. This precipitate after separation from the solution, may be washed, dried, rewashed, redried, and calcined as in Process 1. The solution and wash waters contain acid salts of aluminum and calcium. The calcium in the solution may be converted into its sulfate hydrate by addition of sulfuric acid and boiling, if desired, or the solution may be discarded. The product of ferric oxide containing cuprous copper and zinc oxides is of the same unique nature as the product of Process 1, except that this product contains no silica as does the product from Process 1.

Process 2B

The silicon free solution produced in Process 2 is treated with ammonium hydroxide and hydrogen peroxide until a pH of 6.3–6.5 has been attained and complete oxidation of the ferrous iron to ferric oxide trihydrate has been achieved. Since the isoelectric point of aluminum is between pH 6.5 and 7.5 no aluminum hydroxide trihydrate is formed and the aluminum remains in solution. The copper and zinc ions ordinarily precipitated by hydroxyl ions at a pH between 5.2 and 5.4 remain in solution as copper and zinc amine complexes and also are separated from the insoluble ferric oxide trihydrate formed in the pH change reaction. Boiling of the solution causes complete oxidation of all ferrous iron and the coagulation of the ferric oxide trihydrate. The ferric oxide trihydrate is then separated from the system by filtration or centrifuging. The separated ferric oxide trihydrate is washed with water acidified to a pH of 6.5 with the original acid used for solvation and containing approximately 1% ammonium chloride salt until freed of occluded soluble aluminum, copper, zinc, and calcium ions. The ferric oxide trihydrate is dried, rewashed, redried, and calcined or it may be dissolved in the least amount of hydrochloric acid required to effect its resolution and reprecipitated with aqueous ammonia to yield a very high purity ferric oxide trihydrate which is washed, dried, rewashed, redried, and calcined producing a very high purity ferric oxide ($Fe_2O_3$) useful for a great number of uses. The solution containing aluminum, copper, zinc, and calcium may be electrolyzed by known methods for the recovery of copper and zinc metals and the calcium may be recovered as the sulfate as previously described, if desired.

Process 3

The solution obtained by dissolving the acid soluble constituents of the slag as described above contains the same components as noted above under Process 1. This solution is treated with aqueous ammonia and alkali peroxide or hydrogen peroxide until the solution has a pH between 6.3 and 6.5. As a result the coprecipitation of insoluble silica and trihydrated ferric oxide occurs leaving the acid soluble salts and ammine salts of aluminum, calcium, copper, and zinc in solution. The coprecipitate of silica and trihydrated ferric oxide is separated from the solution and is then washed, dried, rewashed, redried, and calcined in the same manner as the composite product of silica, trihydrated ferric oxide containing copper and zinc oxides as described under Process 1. The solution containing aluminum, copper, zinc and calcium may be treated to recover the same as described in Process 2B, above.

In each of the foregoing described processes the separation of the various compounds and combinations of compounds is based upon the relationship between the different pH values at which the various metallic ions in different states of oxidation react with the hydroxyl group of either alkali hydroxides or ammonium hydroxide to form their respective hydrated oxides. By keeping the metallic ions in their reduced state in the original acidic medium in which they are formed wherein the quality and quantity of hydrogen ion is controlled, it is possible to separate the individual elements either as specific compounds or as groups of specific compounds as desired. The choice of use of alkali hydroxide or ammonium hydroxide selectively, enables additional control as to the forming of either copper and zinc hydroxides or the forming of copper and zinc ammines. Based upon the knowledge of the following pH values at which the various metallic hydroxide compounds form it can be easily and quickly comprehended that by the judicious use of hydrogen and hydroxyl ion concentration, the nature of the hydroxyl cation used, and by controlling the state of oxidation or reduction of the soluble ions in the system the exact separation and isolation of the variously described end products becomes possible. The pH values at which the various metallic hydrated oxides (hydroxides) form is as follows:

Ferric iron _____ pH of 2 to 3.
Zinc _____ pH of 5.2.
Copper _____ pH of 5.4.
Ferrous iron _____ pH of 5.5.
Aluminum _____ pH of 6.5 to 7.5.

Other oxidants than the peroxides could be employed provided they are compatible with the pH's of the system, but the particular oxidants employed leave either no or easily removable amounts of residual ions with minimum loss of the oxidized materials. Also, by employment of this group of oxidants in the presence of high concentration of ferrous iron ion, the copper ion remains for the most part in the cuprous ion state.

In the specific example above, the volume of 4 normal acid used amounted to 180 ml. while the type of acid used was hydrochloric. Sulfuric acid or mixtures of hydrochloric and sulfuric acids are useful in the process and the only real difference between their use and the use of HCl lies in the behavior of the calcium which is precipitated as calcium sulfate and remains with the acid insoluble residue. Use of a smaller volume of the 4 normal acid results in the dissolving of a proportionately smaller amount of the slag, while use of larger amounts cause solution of larger amounts of the slag. Examples are: with the use of 100 grams of slag in each case, where 300 ml. of acid were used, 50.1% of the slag remained undissolved, while with use of 150 ml. of the acid 67% of the slag remained undissolved. Variation of normality of the acid between a normality of 3 and a normality of 4.5 as well as variation of amount of acid used dissolved varying amounts of slag where the greater the normality and the greater the amount of acid used the larger the amount of slag was dissolved. In the case of use of acid of concentration above 4.5 normal an undesirable gel formed which gel prevented separation of soluble from insoluble. A gel is likewise formed when 3.0 to 4.5 normal acid solutions of temperatures above 175° F. are used as solvation agents. With concentrations of acid below 3.5 normal the degree of acid solvation becomes too poor for economical purposes.

Special note should be accorded the various products formed. The enumeration of use as previously noted is not intended to limit the use of the products recoverable by these processes. In view of the unique nature of the composite product of silica, iron, copper, and zinc, in addition to its possible use in the surface coating industry, and in the field of agriculture, it could be used in many industrial applications. As the formation of "silica gel" is such that it lends itself to a manifest number of known treatments for conversion into a variety of "types" ranging from unreactive silicon dioxide into highly adsorbent silica by presently known methods, it suffices to state that the separation and isolation of the monohydrate of silicon dioxide provides either an end product or a starting product for a host of physical forms of silicon dioxide. Likewise, the aggregate of silica, iron hydroxide, copper and zinc hydroxide as well as the aggregate of silica and iron hydroxide (free of copper and zinc) after their original formation and separation without dehydrating and calcining could be selectively treated by known methods applied to producing activated silica gel to produce activated silica gel containing iron or activated silica gel containing iron, copper, and zinc to be used industrially for special types of adsorption requirement applications. In the case of every product containing large percentages of iron, such product could be modified for use in the manufacture of steel depending upon the needs and requirements of the industry. Isolation and recovery of the calcium in the form of its sulfate is possible, but except for such recovery in a high state of purity may not be economically justifiable.

What is claimed as new is as follows:

1. A wet process for the separation, isolation and recovery of the acid-soluble metallic and non-metallic values in waste slag resulting from the reverberatory refining of copper pyritic type ores which comprises:

crushing the slag;

adding a warm solution of at least one mineral acid selected from the group consisting of HCl and $H_2SO_4$ to said crushed slag, said solution having a normality of between 3.0 and 4.5 at the time it is added to the slag;

mixing the slag and acid for at least about 8 minutes under conditions such that the two are not permitted to reach a temperature exceeding 175° F., whereby the formation of silica gel is avoided;

separating the solid insoluble residue from the solution of silicic acid and the acid salts of the acid soluble iron, aluminum, copper, zinc and calcium originally present in said slag;

recovering the iron, copper, calcium, silicon, zinc and aluminum values from said solution, after adding a hydroxide to said solution to raise the pH of said solution to at least about 2.8 and not more than about 6.5.

2. The process of claim 1 wherein the recovery of the values in the solution separated from the acid-insoluble residue comprises:

(a) addition of alkali metal hydroxide and a peroxide to said solution of the acid solubles, in an amount sufficient to raise the pH of the resulting solution to between about 6.3 and 6.5;

(b) boiling the solution to precipitate a mixture of hydrated oxides of silicon and iron and containing the oxides of copper and zinc;

(c) physically separating said precipitate from the remaining solution;

(d) drying the so-separated precipitate;

(e) heating the dried precipitate further, to calcine the same; and (f) recovering the calcined product consisting of oxides of iron, silicon, copper and zinc intimately combined with one another.

3. The process of claim 2 wherein the peroxide is selected from the group consisting of hydrogen peroxide and alkali metal peroxides.

4. The process of claim 2 wherein the alkali metal hydroxide is selected from the group consisting of KOH and NaOH.

5. The process of claim 1 wherein the recovery of the values in the solution separated from the acid-insoluble residue comprises:

(a) addition of ammonium hydroxide and a peroxide to said solution of the acid solubles, in an amount sufficient to raise the pH of the resulting solution to between about 6.3 and 6.5;

(b) boiling the solution to precipitate a mixture of hydrated oxides of iron and silicon;
(c) physically separating said precipitate from the remaining solution;
(d) washing, drying and calcining the separated precipitate; and
(e) recovering the calcined product consisting of the coprecipitated oxides of iron and silicon.

6. The process of claim 5 including in addition recovering the copper and zinc from the remaining solution after said coprecipitate has been physically separated therefrom.

7. The process of claim 5 wherein the peroxide is selected from the group consisting of hydrogen peroxide and alkali metal peroxides.

8. The process of claim 1 wherein the recovery of the values in the solution separated from the acid-insoluble residue comprises:
(a) adding alkali metal hydroxide to said solution in an amount sufficient to raise the pH of the resulting solution to between about 2.8 and 3.0, thereby precipitating the silicon therein as insoluble $SiO_2 \cdot H_2O$;
(b) physically separating the precipitate from the remaining solution;
(c) washing the precipitate; and
(d) recovering the resultant silica gel.

9. The process of claim 8 including
(a) adding additional base to the remaining liquid after the precipitate has been separated therefrom, the amount of base being sufficient to raise the pH of the resulting solution to at least 6.3;
(b) boiling the resulting solution to precipitate the iron as a hydroxide;
(c) physically separating the precipitate from the remainder of the mixture;
(d) washing, drying and calcining the precipitate; and
(e) recovering an iron oxide containing product.

10. The process of claim 9 wherein the base added is a mixture consisting of alkali metal hydroxide and a peroxide selected from the group consisting of alkali metal peroxides and hydrogen peroxides, the addition being sufficient to raise the pH of the resulting solution to between 6.3 and 6.5 and the product recovered as a washed, dried and calcined precipitate consisting of iron oxide containing oxides of copper and zinc intimately associated therewith.

11. The process of claim 9 wherein the base added is a mixture of $NH_4OH$ and $H_2O_2$ and the amount added is sufficient to raise the pH of the resulting solution to between 6.5 and 7.0, and the solution separated from the precipitated iron oxide is processed to recover the copper and zinc therefrom.

No references cited.

DAVID L. RECK, *Primary Examiner.*

N. F. MARKVA, *Examiner.*